(12) United States Patent
Chang (10) Patent No.: US 12,427,943 B2
(45) Date of Patent: Sep. 30, 2025

(54) VEHICLE PREVENTION AIRBAG SYSTEM

(71) Applicant: Chia-Wei Chang, Taichung (TW)

(72) Inventor: Chia-Wei Chang, Taichung (TW)

( * ) Notice: Subject to any disclaimer, the term of this patent is extended or adjusted under 35 U.S.C. 154(b) by 0 days.

(21) Appl. No.: 18/889,338

(22) Filed: Sep. 18, 2024

(65) Prior Publication Data

US 2025/0091540 A1 Mar. 20, 2025

Related U.S. Application Data

(60) Provisional application No. 63/539,320, filed on Sep. 19, 2023.

(51) Int. Cl.
*B60R 21/0134* (2006.01)
*B60R 21/36* (2011.01)

(52) U.S. Cl.
CPC .......... *B60R 21/0134* (2013.01); *B60R 21/36* (2013.01)

(58) Field of Classification Search
CPC .............. B60R 21/013; B60R 21/0132; B60R 21/0134; B60R 21/0136; B60R 21/11; B60R 21/36; B60R 2021/01211; B60R 2021/01252; B60R 2021/138; B60R 2021/23107
See application file for complete search history.

(56) References Cited

U.S. PATENT DOCUMENTS

| | | | | |
|---|---|---|---|---|
| 5,646,613 A * | 7/1997 | Cho | ...................... | G01S 13/931 340/904 |
| 5,732,785 A * | 3/1998 | Ran | ...................... | B60R 19/205 180/274 |
| 6,106,038 A * | 8/2000 | Dreher | ...................... | B60T 7/22 293/118 |
| 6,227,325 B1 * | 5/2001 | Shah | ...................... | B64C 25/56 180/274 |
| 6,408,237 B1 * | 6/2002 | Cho | ...................... | B60R 21/36 340/436 |

(Continued)

FOREIGN PATENT DOCUMENTS

| | | | | |
|---|---|---|---|---|
| DE | 10346949 A1 * | 9/2005 | .......... | B60R 19/205 |
| GB | 2515894 A * | 1/2015 | .......... | B60R 19/205 |
| JP | 2005247310 A * | 9/2005 | | |

*Primary Examiner* — Laura Freedman
(74) *Attorney, Agent, or Firm* — Li & Cai Intellectual Property Office (57) ABSTRACT

A vehicle prevention airbag system includes an airbag prevention device and a threat detection device including a collision assessment unit and a sensor module for detecting threat objects or obstacles approaching the vehicle and to assess the collision probability between the threat object or obstacle and the vehicle. The airbag prevention device includes an airbag expansion controller and an external airbag module. When collision probability between the threat object and the vehicle is equal to or greater than a safety threshold, the threat detection device establishes a first collision determination message. The airbag prevention device expands at least one prevention airbag in the direction corresponding to the impact based on the first collision determination message. When the vehicle is impacted and may collide with an obstacle, a second collision determination message is established. The external airbag is expanded in the direction corresponding to the second collision determination message.

6 Claims, 10 Drawing Sheets

(56) References Cited

U.S. PATENT DOCUMENTS

| | | | | |
|---|---|---|---|---|
| 6,416,093 | B1* | 7/2002 | Schneider | B60R 19/205 |
| | | | | 293/118 |
| 6,757,611 | B1* | 6/2004 | Rao | B60R 21/0134 |
| | | | | 180/274 |
| 7,009,500 | B2* | 3/2006 | Rao | B60R 21/013 |
| | | | | 340/435 |
| 7,048,086 | B2* | 5/2006 | Yoneda | B60R 21/34 |
| | | | | 180/274 |
| 7,138,938 | B1* | 11/2006 | Prakah-Asante | G01S 15/931 |
| | | | | 367/87 |
| 7,232,001 | B2* | 6/2007 | Hakki | B60R 19/205 |
| | | | | 180/271 |
| 7,806,221 | B2* | 10/2010 | Mishra | B60R 21/01508 |
| | | | | 280/730.1 |
| 7,828,106 | B1* | 11/2010 | Ratajski | B60R 21/13 |
| | | | | 296/210 |
| 9,373,202 | B2* | 6/2016 | Shimizu | G07C 5/085 |
| 9,815,427 | B2* | 11/2017 | Barbat | B60R 21/20 |
| 10,029,638 | B1* | 7/2018 | Lombrozo | B60R 21/0134 |
| 11,654,849 | B2* | 5/2023 | Nagasawa | B60R 21/0134 |
| | | | | 180/271 |
| 12,024,108 | B2* | 7/2024 | Lee | B60R 21/0132 |
| 2023/0242154 | A1* | 8/2023 | Difrancesco | B60W 30/085 |
| | | | | 701/23 |

* cited by examiner

VEHICLE PREVENTION AIRBAG SYSTEM

CROSS-REFERENCE TO RELATED PATENT APPLICATION

This application claims the benefit of priority to U.S. Provisional Patent Application No. 63/539,320, filed on Sep. 19, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a vehicle prevention airbag system, and more particularly to a vehicle prevention airbag system used in automobiles or motorcycles to reduce damage when the vehicle is impacted.

BACKGROUND OF THE DISCLOSURE

Automobiles are increasingly emphasizing safety. To protect passengers, in addition to an increasing number of airbags, advanced driver-assistance systems (ADAS), such as Automatic Emergency Braking (AEB), Lane Departure Warning (LDW), Lane Centering Control (LCC), Pedestrian Detection System (PDS), Adaptive Cruise Control (ACC), etc., are commonly used to enhance driving safety.

While vehicle safety can be enhanced through technology, it cannot prevent the vehicle from being struck by other improperly operated vehicles or from being involved in accidents caused by other vehicles. Existing vehicle safety technologies rely on seat belts and interior airbags as a last-ditch attempt to protect the driver and passengers. However, when a vehicle is severely impacted to cause the vehicle body to deform and crumple, the use of seat belts and airbags alone may not be sufficient to ensure the safety of the driver or passengers.

Moreover, in typical vehicle accidents, in addition to the initial impact, secondary collisions caused by the vehicle being pushed or rolling over can result in even more severe injuries.

Therefore, improving vehicle prevention systems to overcome the aforementioned deficiencies has become an important issue that this industry seeks to address.

SUMMARY OF THE DISCLOSURE

The technical problem to be solved by the present disclosure is to provide a vehicle prevention airbag system to address the deficiencies in existing vehicle prevention technologies.

To solve the above-mentioned technical problem, the present disclosure adopts a technical solution that provides a vehicle prevention airbag system, configured to be installed in a vehicle, the vehicle prevention airbag system including: an airbag prevention device, wherein the airbag prevention device includes an airbag expansion controller and an external airbag module connected to the airbag expansion controller; the external airbag module includes at least one of a rear-side prevention airbag, a front-side prevention airbag, a left-side prevention airbag, and a right-side prevention airbag that are disposed around the vehicle; and a threat detection device, wherein the threat detection device is installed in the vehicle, the threat detection device includes a collision assessment unit and a sensor module connected to the collision assessment unit, the sensor module includes a plurality of sensor units surrounding the vehicle in multiple directions; the collision assessment unit is configured to detect a threat object approaching the vehicle through at least one of the plurality of sensor units of the sensor module, to assess a probability of collision between the threat object and the vehicle before the threat object collides with the vehicle, and to establish a first collision determination message when a probability of collision between the threat object and the vehicle is determined to be equal to or greater than a safety threshold; wherein the airbag prevention device is coupled to the threat detection device, the airbag prevention device is configured to control an expansion of the at least one of the prevention airbags in a direction corresponding to the first collision determination message through the airbag controller based on the direction corresponding to the first collision determination message; the threat detection device is further configured to detect a relative position and a relative distance between an obstacle around the vehicle and the vehicle through the sensor module after the vehicle has been impacted by the threat object, to assess a probability of collision between the obstacle and the vehicle through the collision assessment unit, and to establish a second collision determination message when a probability of collision between the obstacle and the vehicle is determined to be equal to or greater than a safety threshold; the airbag expansion controller is configured to control the expansion of the at least one of the rear-side prevention airbag, the front-side prevention airbag, the left-side prevention airbag, or the right-side prevention airbag in an impact direction corresponding to the second collision determination message based on the second collision determination message, so as to reduce an impact force of the secondary collision between the vehicle and the obstacle.

One of the beneficial effects of the embodiments of the present disclosure is that the airbag prevention device of the vehicle prevention airbag system described in the present disclosure, combined with the threat detection device, can control the expansion of at least one prevention airbag in the corresponding impact direction before the collision occurs when the probability of the vehicle being impacted by the threat object is greater than or equal to the safety threshold, thereby reducing the deformation of the vehicle body caused by the impact, and consequently reducing the damage to the vehicle and passengers.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether or not a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, messages or the like, which are for distinguishing one component/message from another one only, and are not intended to, nor should be construed to impose any substantive limitations on the components, messages or the like.

First Embodiment

Referring to FIGS. 1 to 8, the first embodiment of the present disclosure provides a vehicle prevention airbag system 1, and the vehicle prevention airbag system 1 is installed on a vehicle 2 to reduce body deformation of the vehicle 2 during a collision and to mitigate injuries to passengers in the vehicle 2 or other individuals affected by the collision involving the vehicle 2.

Figure 1:
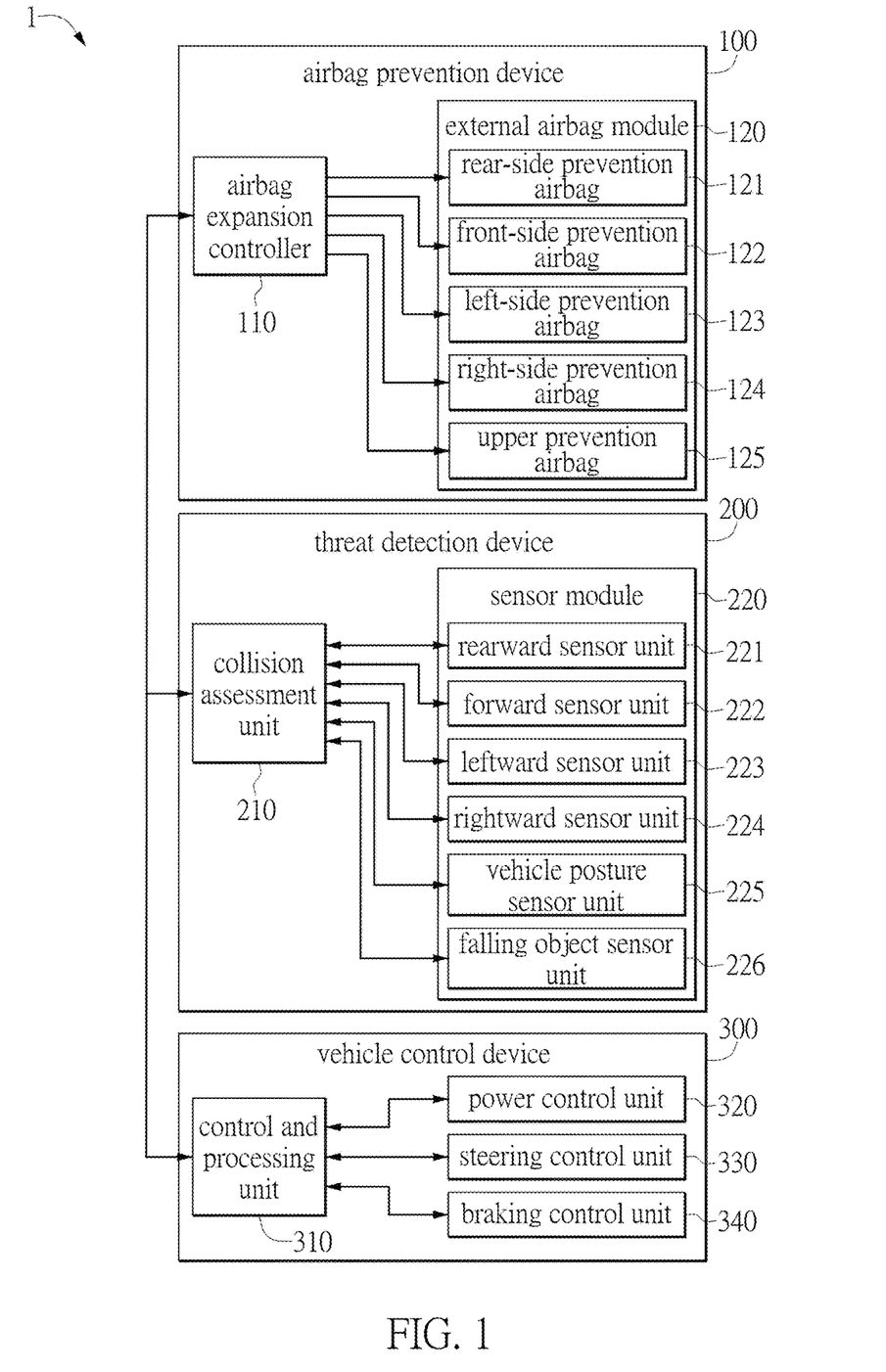
FIG. 1 is a block diagram illustrating the system of the vehicle prevention airbag system of the present disclosure.

As shown in FIG. 1, the vehicle prevention airbag system 1 includes an airbag prevention device 100, a threat detection device 200, and a vehicle control device 300 installed on the vehicle. The airbag prevention device 100 includes an airbag expansion controller 110 and an external airbag module 120 connected to the airbag expansion controller 110. Referring to FIG. 1, in this embodiment, the external airbag module 120 includes at least one of a rear-side prevention airbag 121, a front-side prevention airbag 122, a left-side prevention airbag 123, and a right-side prevention airbag 124 arranged around the vehicle 2. The airbag expansion controller 110 is capable of controlling the expansion of the at least one prevention airbag in the external airbag module 120 corresponding to the direction in which the vehicle may be impacted, so as to reduce the impact force when the vehicle 2 is struck.

The threat detection device 200 is installed on the vehicle 2 and includes a collision assessment unit 210 and a sensor module 220 connected to the collision assessment unit 210. Referring to FIG. 1, in this embodiment, the sensor module 220 includes at least one of a rearward sensor unit 221, a forward sensor unit 222, a leftward sensor unit 223, and a rightward sensor unit 224, which are used to detect the approaching threat object 3 (e.g., a vehicle coming from behind) from various directions around the vehicle 2. The system also includes a vehicle posture sensor unit 225 and a falling object sensor unit 226, which are used to detect abnormal tilting or rolling movements of the vehicle 2 and to detect the threat object or events approaching from above the vehicle 2.

More specifically, the rearward sensor unit 221, the forward sensor unit 222, the leftward sensor unit 223, and the rightward sensor unit 224 of the sensor module 220 may be selected from ultrasonic sensors, millimeter-wave radars, cameras, laser rangefinders, depth cameras, and LiDAR sensors, or a combination thereof. The collision assessment unit 210 may be a processor capable of integrating the sensing messages from the various sensors in the sensor module 220 to determine the probability of a collision between the vehicle 2 and the threat object 3 from any direction. The collision assessment unit 210 is configured to detect the threat object 3 approaching the vehicle 2 from any direction through the sensor module 220 and to determine the probability of the threat object 3 colliding with the vehicle 2 before the threat object 3 actually collides with the vehicle 2. When the probability of collision is determined to be equal to or greater than a safety threshold, the collision assessment unit 210 establishes a first collision determination message.

Figure 2:
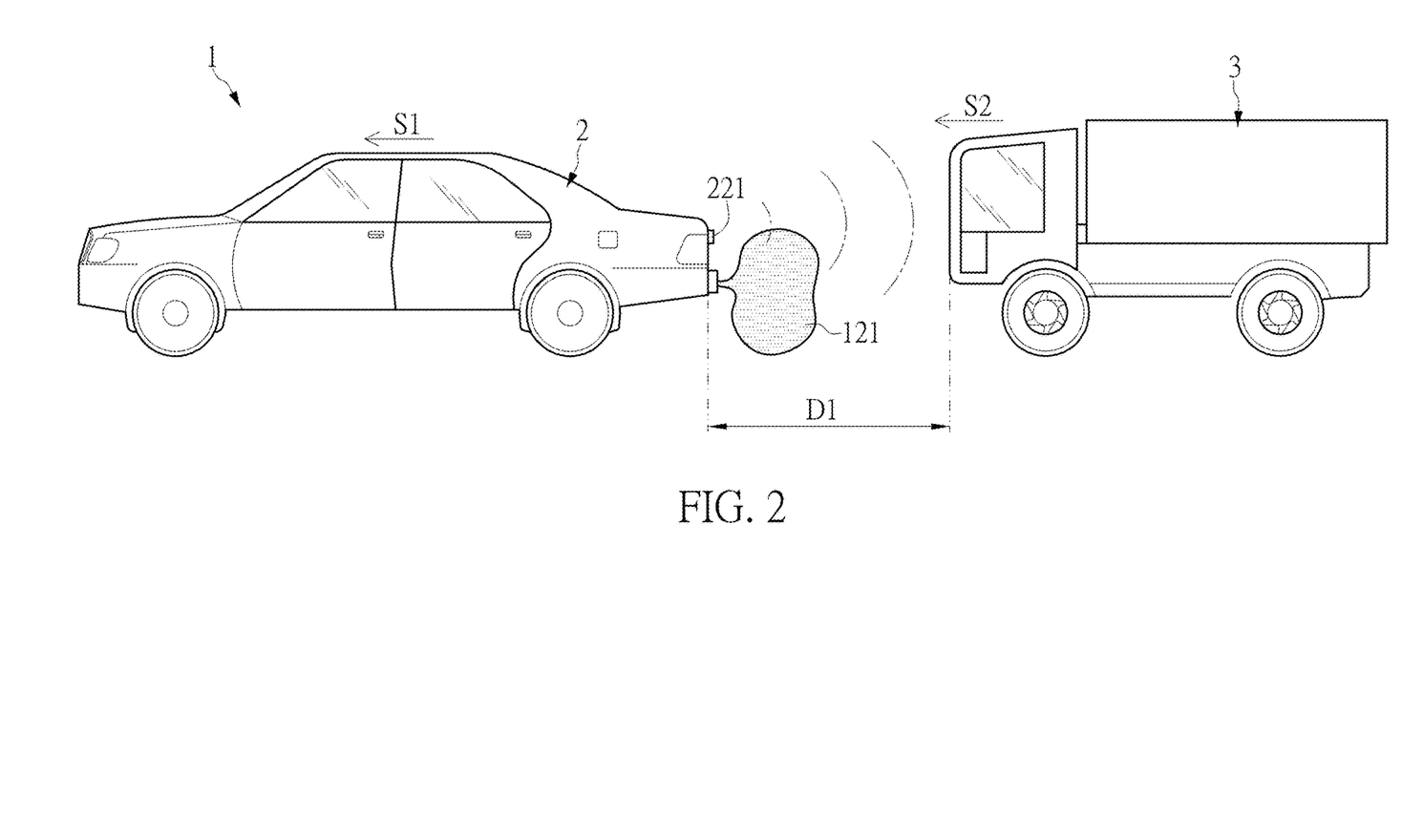
FIG. 2 is a schematic diagram illustrating the operation of the vehicle prevention airbag system of the present disclosure when there is a possibility of a rear-end collision by a following vehicle.

For example, as shown in FIG. 2, the threat detection device 200 can calculate the relative speed between the rear threat object 3 and the vehicle 2 through the speed S1 of the vehicle 2 and the speed S2 of the rear threat object 3, as well as the relative distance D1 between the rear threat object 3 and the vehicle 2, and can also utilize information such as the path or predicted direction of movement of the rear threat object 3 detected by sensors like cameras, LiDAR, or radar, and combine this with environmental sensor data (e.g., weather conditions, road conditions, and the vehicle's own operating status such as speed, acceleration or deceleration, lateral acceleration, or yaw rate) to comprehensively calculate the probability of collision between the rear threat object 3 and the vehicle 2. When the probability of collision exceeds the safety threshold (e.g., a probability of collision greater than 70%), the first collision determination message is sent.

The threat detection device 200 is coupled with the airbag prevention device 100. When the first collision determination message is sent by the threat detection device 200, the airbag prevention device 100 can receive the first collision determination message and, through the airbag expansion controller 110, expand at least one prevention airbag in the external airbag module 120 corresponding to the direction in which the vehicle 2 is likely to be impacted before the threat object 3 collides with the vehicle 2. This expansion buffers the impact force of the rear threat object 3 to the vehicle 2, thereby reducing the body deformation of the vehicle 2 caused by the impact and minimizing the injury to the driver or passengers.

Preferably, the vehicle prevention airbag system 1 of the present disclosure is also coupled with a vehicle control device 300 installed on the vehicle 2. The vehicle control device 300 includes a control and processing unit 310, a power control unit 320, a steering control unit 330, and a braking control unit 340.

The threat detection device 200 is configured to detect whether there are other obstacles (e.g., vehicles ahead, pedestrians, streetlights, poles, traffic islands) in the road ahead of the vehicle 2 when the probability of collision between the vehicle 2 and the threat object 3 is determined to be equal to or greater than the safety threshold, and to assess whether there is a space sufficient for the vehicle 2 to escape or avoid the collision (e.g., a distance between vehicle 2 and the vehicle in front is sufficient for the vehicle 2 to accelerate forward, or for the left and right lanes to be turned). When it is determined that the vehicle 2 has a space to escape or avoid the collision, the threat detection device 200 can control the vehicle 2 through the vehicle control device 300 to take one or more evasive actions such as accelerating, decelerating, displacing, or steering.

The vehicle prevention airbag system 1 of the present disclosure is also configured to further detect and assess whether the vehicle 2 is likely to collide with another threat object in a secondary collision after the vehicle 2 has suffered a first impact and to expand at least one prevention airbag in the external airbag module 120 corresponding to the direction of the second collision, so as to reduce the damage caused when the vehicle 2 undergoes a secondary collision.

Figure 3:
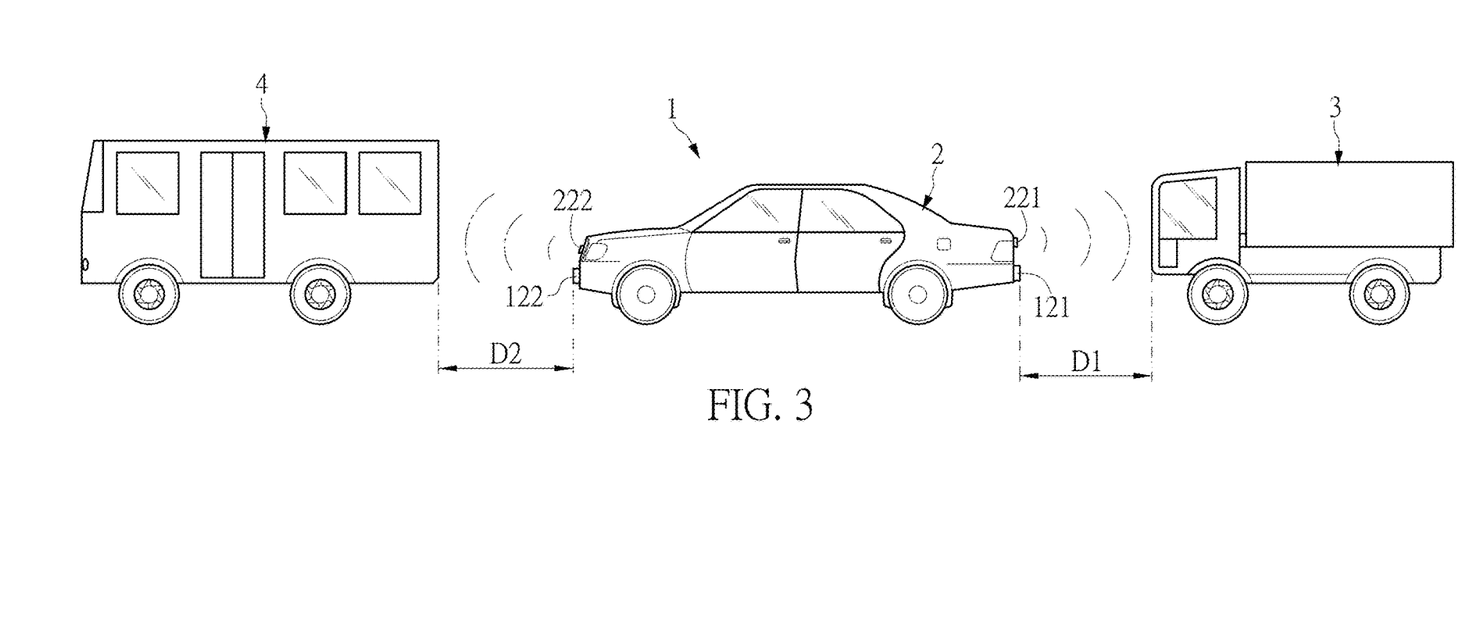
FIGS. 3 and 4 are schematic diagrams illustrating the operation of the vehicle prevention airbag system of the present disclosure in a situation where a secondary collision may occur at the front of the vehicle after an impact from the rear.
Figure 4:
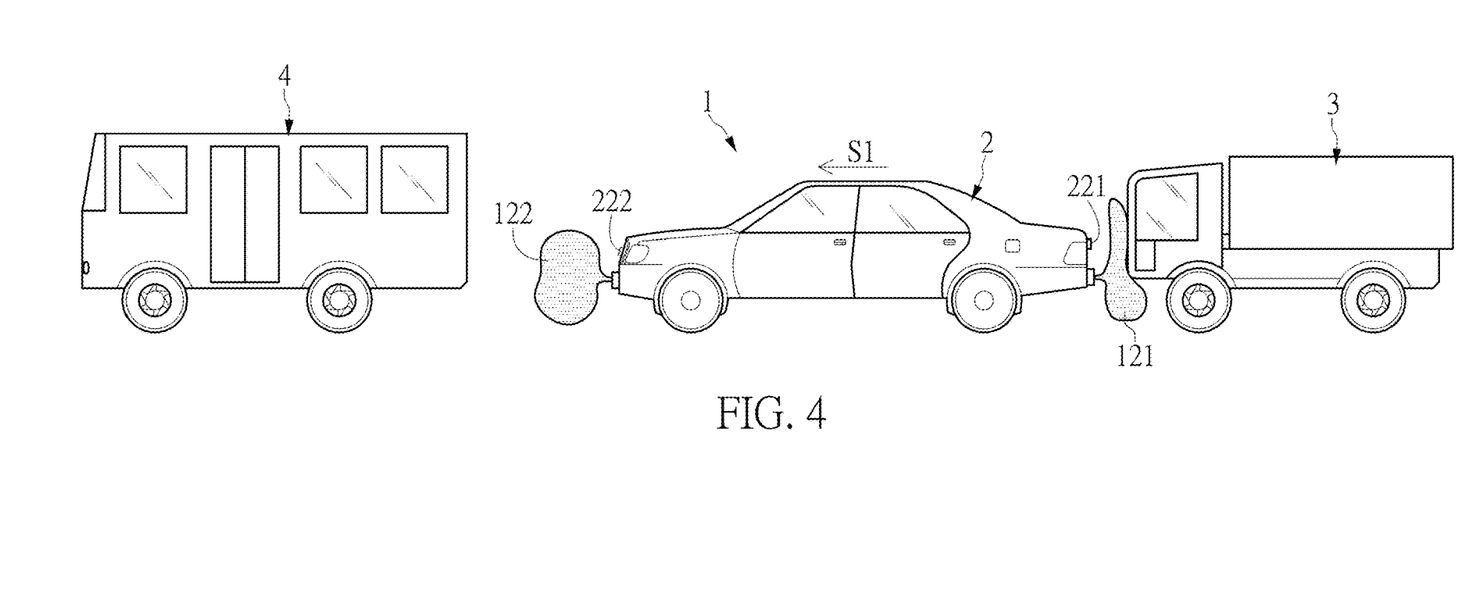
Figure 5:
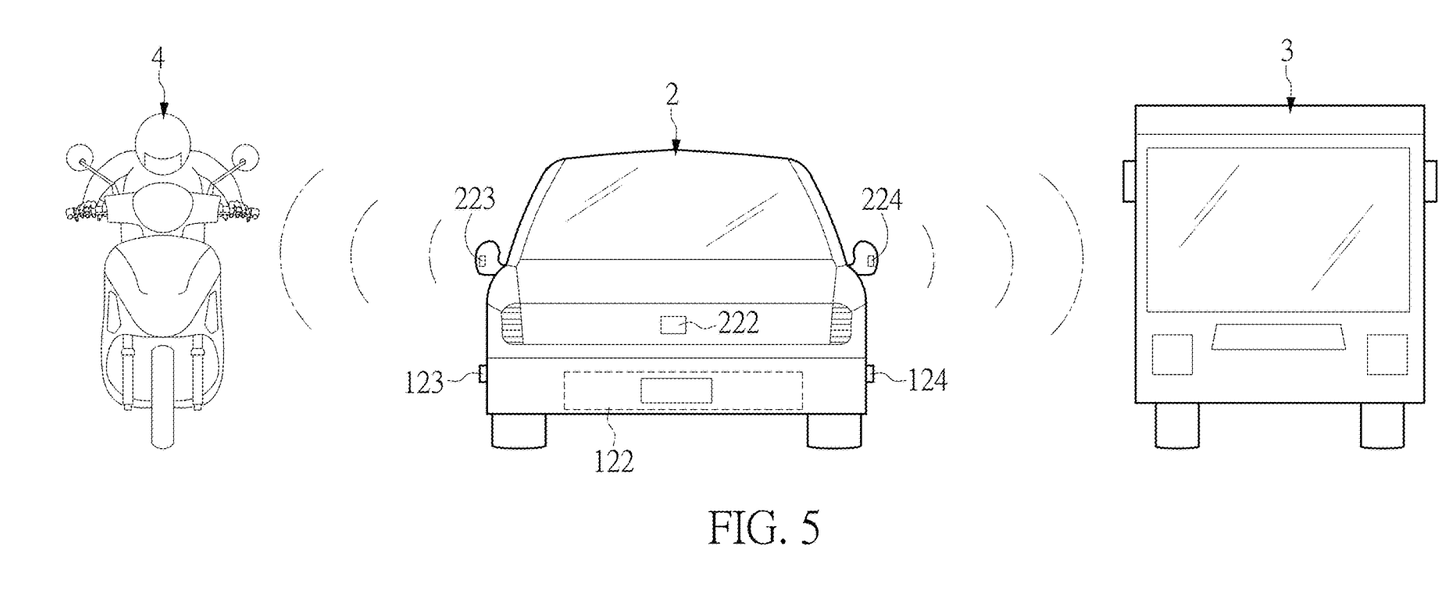
FIGS. 5 and 6 are schematic diagrams illustrating the operation of the vehicle prevention airbag system of the present disclosure in a situation where a secondary collision may occur on the left or right sides of the vehicle.
Figure 6:
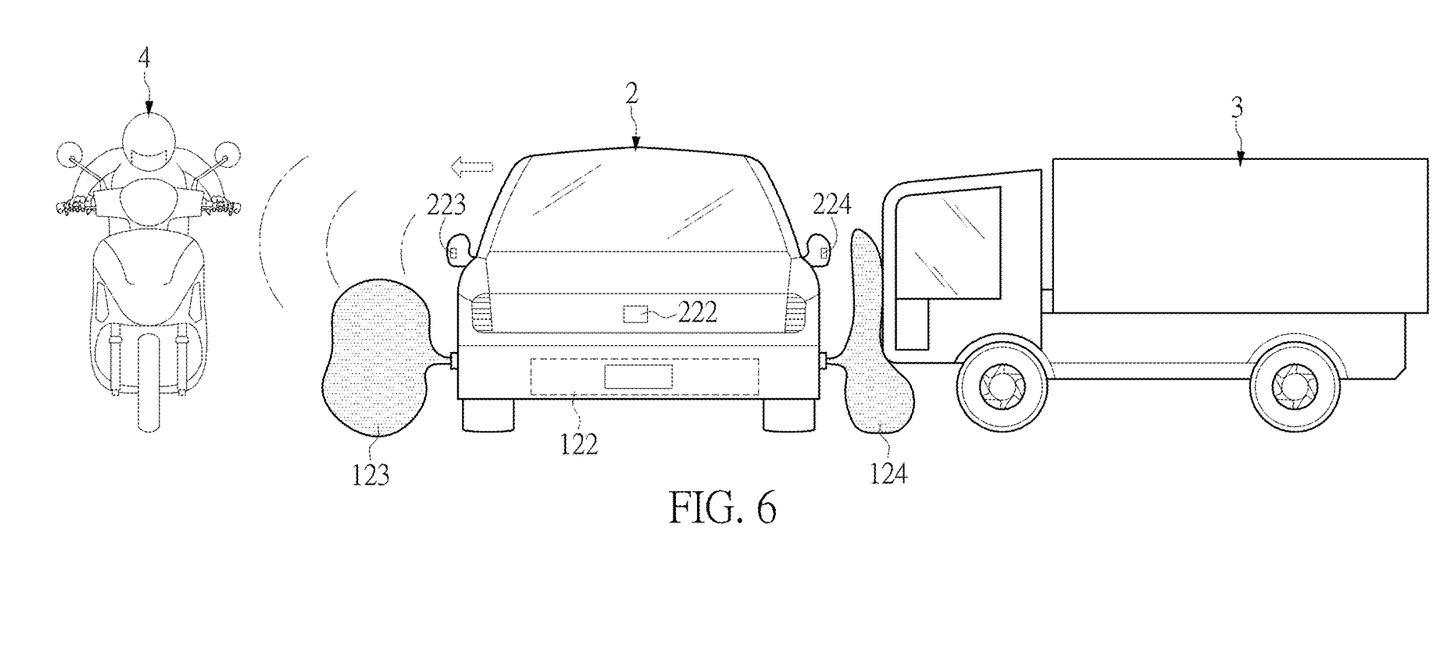

For example, as shown in FIGS. 3 and 4, when the rear side of the vehicle 2 is impacted, the forward sensor unit 222 can detect the relative position and the relative distance between an obstacle 4 (such as a vehicle ahead, pedestrian, streetlamp, utility pole, etc.) located in front of the vehicle 2 and the vehicle 2, and then the collision assessment unit 210 assesses the probability of a secondary collision between the vehicle 2 and the obstacle 4 in front after the vehicle 2 is struck. The collision assessment unit 210 is configured to establish a second collision determination message when the probability of a secondary collision between the vehicle 2 and the obstacle 4 in front is determined to be equal to or greater than a safety threshold. The airbag expansion controller 110 is configured to control the expansion of at least one front-side prevention airbag 122 corresponding to the direction of the secondary collision based on the second collision determination message, thereby reducing the impact force of the collision between the vehicle 2 and the obstacle 4 in front.

The vehicle prevention airbag system 1 in this embodiment not only reduces the damage caused by an initial impact on the rear of the vehicle 2 by the threat object 3 but also further reduces the damage that may occur if the vehicle 2 is pushed forward by the initial impact and collides with an obstacle 4 in front, thereby protecting the vehicle 2 or pedestrians and other obstacles 4 such as vehicles ahead.

More specifically, the vehicle prevention airbag system 1 of the present disclosure is configured with a secondary collision assessment mechanism. This secondary collision assessment mechanism is activated after the vehicle 2 has suffered a first impact and detects and assesses the likelihood of a secondary collision based on the displacement or acceleration caused by the first impact. The collision assessment unit 210 can calculate based on the displacement or acceleration of the vehicle 2 following the first impact and, control the sensor module 220 and the airbag expansion controller 110 to perform actions corresponding to the calculated results based on the calculation.

For example, in this embodiment, as shown in FIGS. 2 to 7, when the vehicle 2 experiences a first impact, it undergoes displacement or acceleration due to the impact. The threat detection device 200 includes a vehicle posture sensor unit 225, which may include sensors such as accelerometers and gyroscopes to detect information such as the vehicle's acceleration, displacement, and tilt angle. After the vehicle 2 is impacted, a computing unit in the vehicle prevention airbag system 1 can use the acceleration or displacement detected by the vehicle posture sensor unit 225, or the sensor units in various directions within the sensor module 220, to determine whether the vehicle 2 has been impacted. The system can then use the detected acceleration or displacement data to calculate a predicted direction for a possible secondary collision. Based on this prediction, it can activate the sensor units within the sensor module 220 corresponding to the predicted secondary collision direction to detect the obstacle or the threat object in that direction and assess the likelihood of a secondary collision between the vehicle 2 and the obstacle or threat object.

Figure 7:
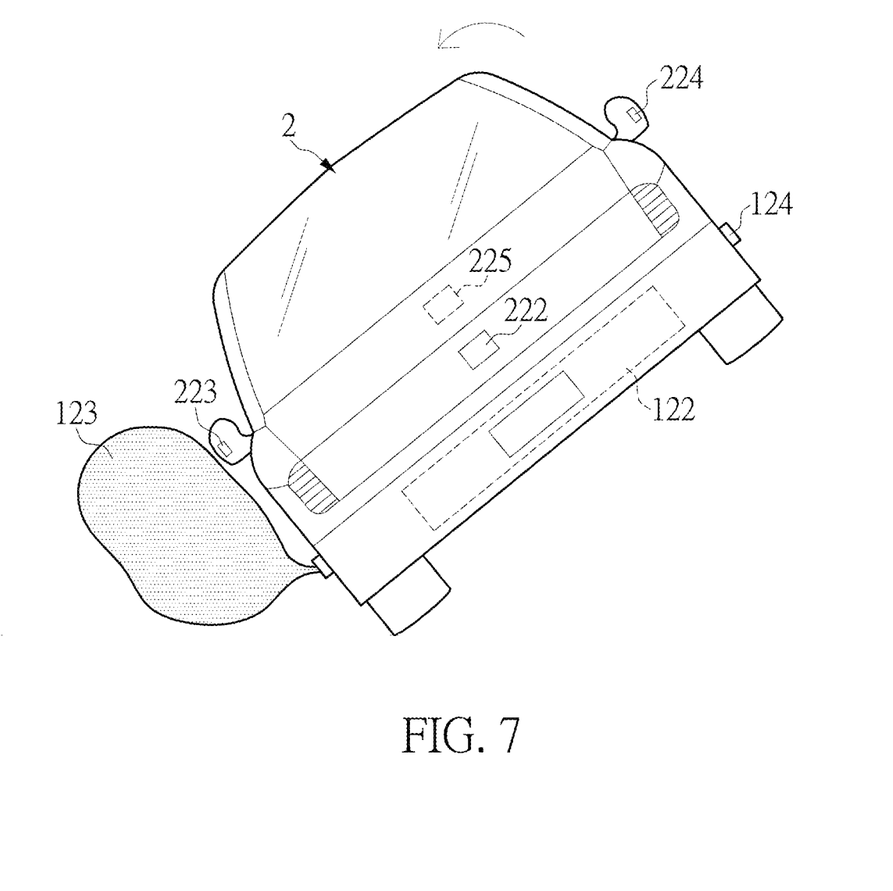
FIG. 7 is a schematic diagram illustrating the operation method of the vehicle prevention airbag system of the present disclosure when the vehicle is in a rollover situation.

Referring simultaneously to FIGS. 1 and 7, in this embodiment, the threat detection device 200 is configured to detect the vehicle's tilt angle and acceleration in different directions via the vehicle posture sensor unit 225 to determine if the vehicle 2 is rolling over. If the vehicle 2 rolls over due to impact or other factors, the collision assessment unit 210 of the threat detection device 200 can establish a rollover determination message. The airbag expansion controller 110 of the airbag prevention device 100 is configured to expand at least one of the front-side prevention airbag, the rear-side prevention airbag, the left-side prevention airbag, or the right-side prevention airbag on the side of the vehicle 2 corresponding to the rollover direction based on the rollover determination message. Alternatively, upon detecting a rollover, it can control the simultaneous expansion of the multiple airbags in the external airbag module 120 to reduce the damage caused by the rollover of the vehicle 2.

Figure 8:
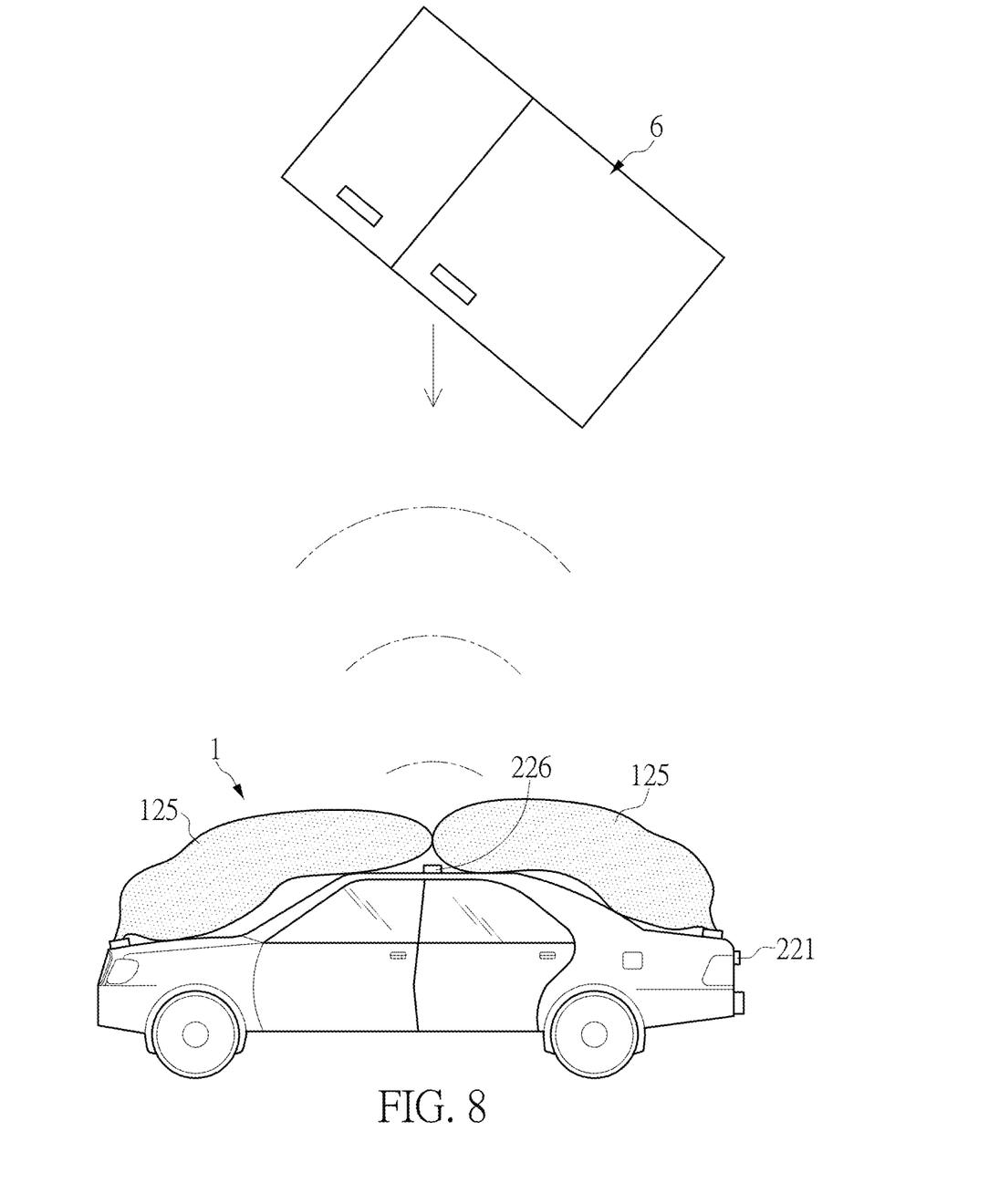
FIG. 8 is a schematic diagram illustrating the operation method of the vehicle prevention airbag system of the present disclosure when a falling object is detected above the vehicle.

Referring simultaneously to FIGS. 1 and 8, in this embodiment, the external airbag module 120 further includes an upper prevention airbag 125 that can be expanded above the vehicle 2. The sensor module 220 includes a falling object sensor unit 226 for detecting the threat object 3 falling from above the vehicle 2.

In this embodiment, the threat detection device 200 is configured to detect the threat object 3 falling from above the vehicle 2 through the falling object sensor unit 226 and establish a falling object threat message when the probability of collision between the threat object 3 and the vehicle 2 is determined to be equal to or greater than a safety threshold. The airbag expansion controller 110 is configured to control the expansion of at least one upper prevention airbag 125 above the vehicle 2 based on the falling object threat message.

More specifically, in this embodiment, the falling object sensor unit 226 can be used to detect the threat object 3 such as falling debris from buildings, falling rocks, collapsed utility poles, fallen roadside trees, or objects falling from vehicles in front, which are threats from above the vehicle 2. It can also detect flying objects established by accidents or collisions in the surrounding area of the vehicle 2. The upper prevention airbag 125, when expanded, can cover the roof and windows of the vehicle 2, thereby reducing the damage caused by the threat object 3 impacting the vehicle 2 from above.

Figure 9:
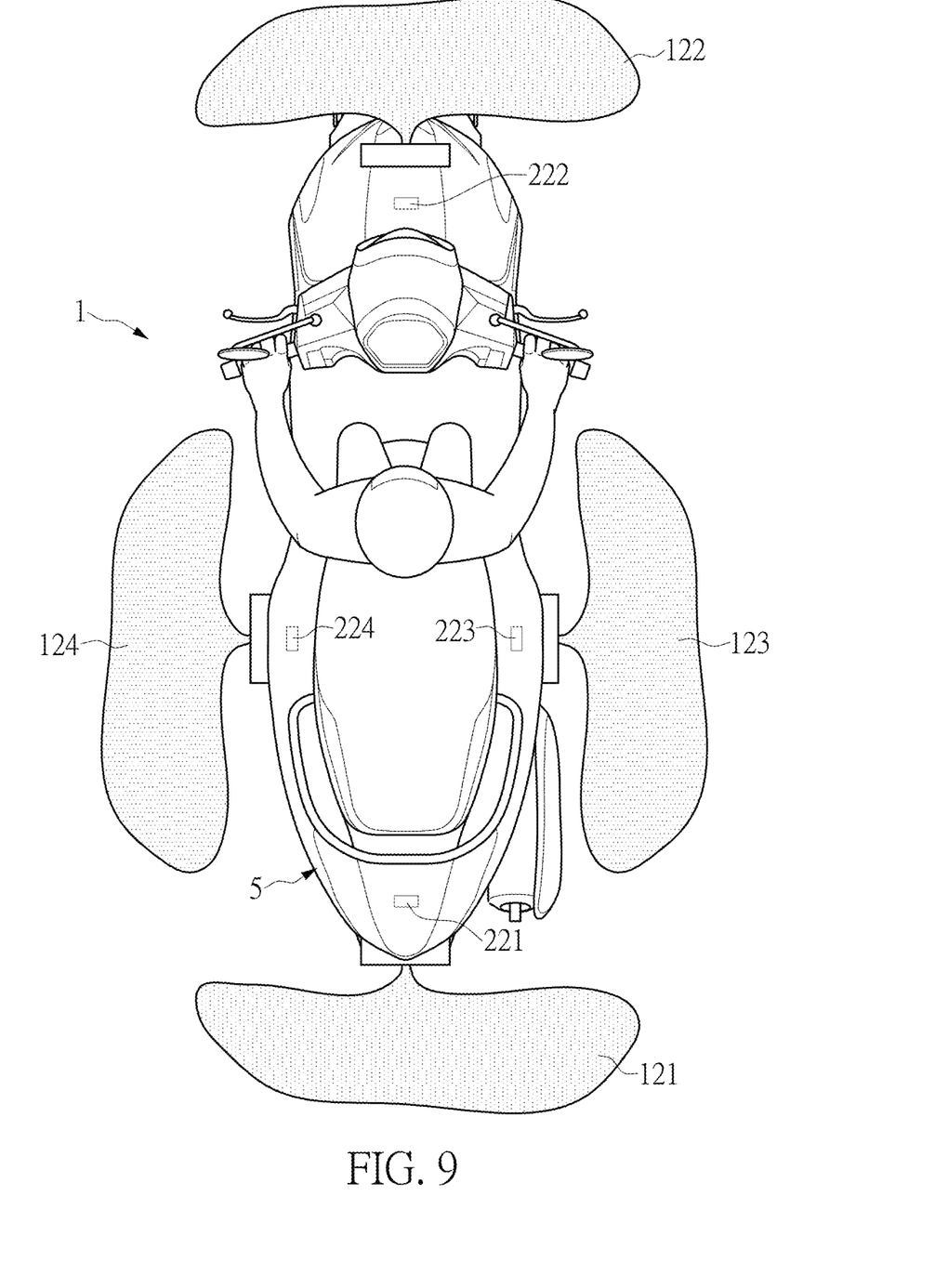
FIG. 9 is a schematic diagram of the second embodiment of the vehicle prevention airbag system of the present disclosure.

As shown in FIG. 9, the second embodiment of the vehicle prevention airbag system 1 of the present disclosure is illustrated. It should be noted that the basic technical content of this embodiment is similar to that of the previous embodiments, and therefore the similar technical content will not be repeated.

In this embodiment, the vehicle prevention airbag system 1 is installed on a motorcycle 5. The rear side, front side, left side, and right side of the motorcycle 5 are respectively equipped with the front-side prevention airbag 122, the rear-side prevention airbag 121, the left-side prevention airbag 123, and the right-side prevention airbag 124, as well as the rearward sensor unit 221, the forward sensor unit 222, the leftward sensor unit 223, and the rightward sensor unit 224. The operation mode of the vehicle prevention airbag system 1 in this embodiment is similar to that of the previous embodiments and will not be repeated.

Figure 10:
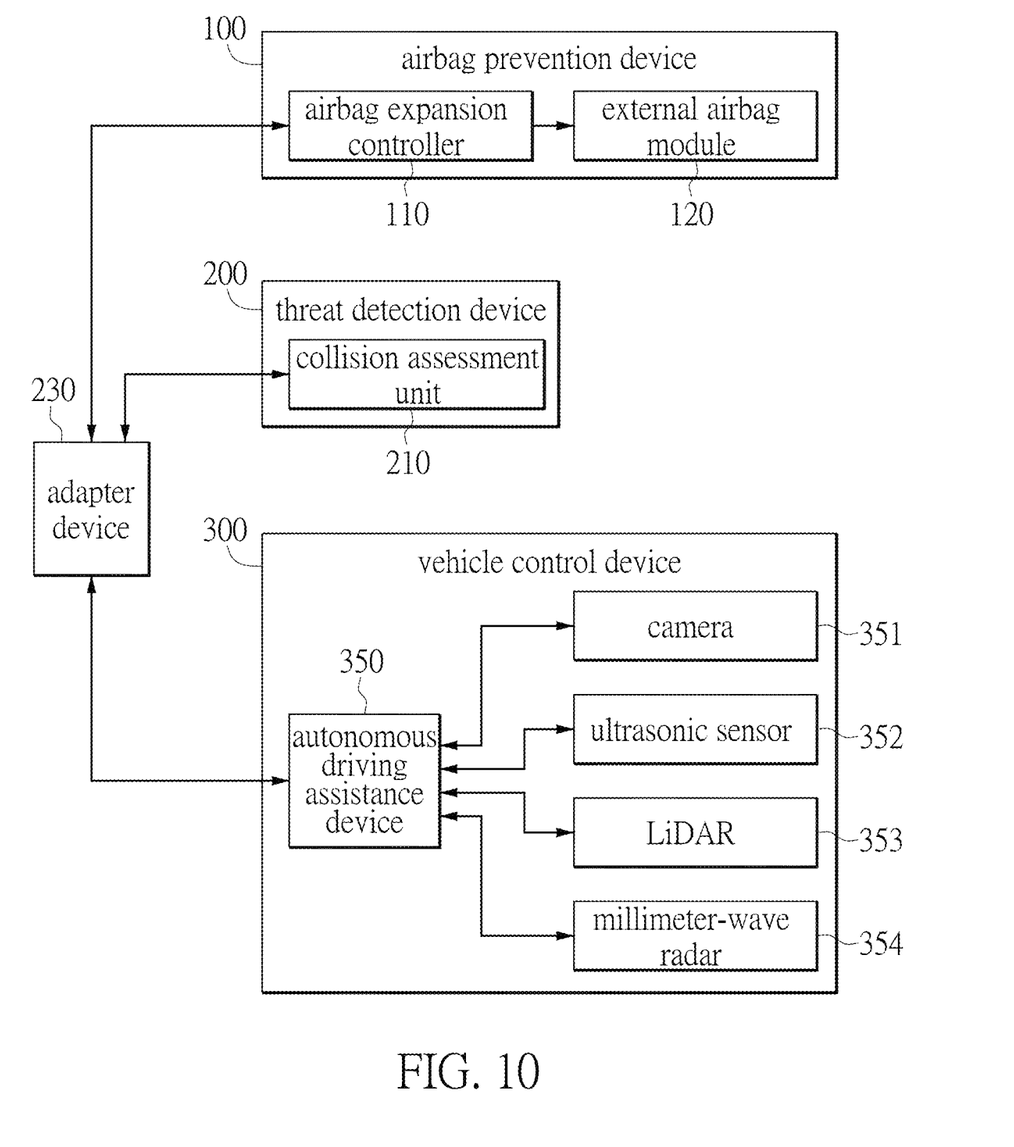
FIG. 10 is a block diagram illustrating the system of the third embodiment of the vehicle prevention airbag system of the present disclosure.

As shown in FIG. 10, the third embodiment of the vehicle prevention airbag system 1 of the present disclosure is illustrated in a block diagram. It should be noted that the basic technical content of this embodiment is similar to that of the previous embodiments, and therefore the similar technical content will not be repeated.

In this embodiment, the vehicle prevention airbag system 1 includes an airbag prevention device 100 and a threat detection device 200. The airbag prevention device 100 includes an airbag expansion controller 110 and an external airbag module 120. The threat detection device 200 includes a collision assessment unit 210.

One of the distinguishing features of this embodiment compared to the previous embodiments is that the threat detection device 200 does not have a sensor module. Instead, it is configured to connect to an autonomous driving assistance device 350 of the vehicle control device 300 via an adapter device 230. This configuration allows the collision assessment unit 210 of the threat detection device 200 to communicate with the autonomous driving assistance device 350 of the vehicle 2 and utilize the various sensors built into the autonomous driving assistance device 350 in place of the rear, front, right, and leftward sensor units of the sensor module to detect the threat object 3 around the vehicle 2 and the obstacle 4 that may result in a secondary collision with the vehicle 2.

More specifically, the autonomous driving assistance device 350 of the vehicle 2 includes a plurality of sensors such as a camera 351, an ultrasonic sensor 352, a LiDAR 353, and a millimeter-wave radar 354 installed on the vehicle 2. The adapter device 230 connects the collision assessment unit 210 of the threat detection device 200 and the autonomous driving assistance device 350 of the vehicle control device 300. The purpose of the adapter device 230 is to serve as an interface for message connection and command translation between the threat detection device 200 and the autonomous driving assistance device 350, thereby enabling the collision assessment unit 210 to communicate with the autonomous driving assistance device 350 of the vehicle 2 The adapter device 230 translates the commands from the threat detection device 200 into control codes that can be accepted by the autonomous driving assistance device 350 of the vehicle control device 300, thereby allowing the threat detection device 200 to detect the threat object 3 around the vehicle 2 and the obstacle 4 that may result in a secondary collision with the vehicle 2 through the various sensors of the autonomous driving assistance device 350.

The collision assessment unit 210 further utilizes the detection messages of the threat object 3 or the obstacle 4 detected by the various sensors of the autonomous driving assistance device 350 of the vehicle 2 to assess the probability of a first collision between the vehicle 2 and the threat object 3, as well as the probability of a secondary collision between the vehicle 2 and the obstacle 4 after a first collision. When the probability of a first collision between the vehicle and the threat object 3 and the probability of a secondary collision with the obstacle 4 are determined to be equal to or greater than a safety threshold, the collision assessment unit 210 sends the first collision determination message and the second collision determination message. The airbag expansion controller 110 then controls the external airbag module 120 to expand the prevention airbags in the direction corresponding to the first collision determination message or the second collision determination message based on the first collision determination message or the second collision determination message.

It is noteworthy that the airbag prevention device 100 and the threat detection device 200 of the vehicle prevention airbag system 1 in this embodiment can be designed for installation on any vehicle 2 equipped with an autonomous driving assistance device 350 through an additional or attached method to allow the vehicle 2 that is not originally equipped with the vehicle prevention airbag system 1 of the present disclosure to be retrofitted with the system to protect the vehicle 2 from collision damage.

Beneficial Effects of the Embodiments

One of the beneficial effects of the embodiments of the present disclosure is that the airbag prevention device of the vehicle prevention airbag system, combined with the threat detection device, can expand at least one prevention airbag in the direction of the impending collision before the collision occurs when the probability of a collision between the vehicle and a threat object is determined to be greater than or equal to the safety threshold, such that the deformation of the vehicle body caused by the impact is reduced, thereby mitigating the damage to the vehicle and the passengers.

Another beneficial effect of the embodiments of the present disclosure is that the threat detection device is capable of detecting obstacles around the vehicle that may cause a secondary collision after the vehicle has been impacted by a threat object. When the probability of a secondary collision between the vehicle and the obstacle is determined to be greater than or equal to a safety threshold, the device can control the expansion of at least one prevention airbag corresponding to the direction of the secondary collision, thereby reducing the damage caused by the secondary collision.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A vehicle prevention airbag system, configured to be installed in a vehicle, the vehicle prevention airbag system including:
   an airbag prevention device, wherein the airbag prevention device includes an airbag expansion controller and an external airbag module connected to the airbag expansion controller; the external airbag module includes at least one of a rear-side prevention airbag, a front-side prevention airbag, a left-side prevention airbag, and a right-side prevention airbag that are disposed around the vehicle; and
   a threat detection device, wherein the threat detection device is installed in the vehicle, the threat detection device includes a collision assessment unit and a sensor module connected to the collision assessment unit, the sensor module includes a plurality of sensor units surrounding the vehicle in multiple directions; the collision assessment unit is configured to detect a threat object approaching the vehicle through at least one of the plurality of sensor units of the sensor module, to assess a probability of collision between the threat object and the vehicle before the threat object collides with the vehicle, and to establish a first collision determination message when a probability of collision between the threat object and the vehicle is determined to be equal to or greater than a safety threshold;
   wherein the airbag prevention device is coupled to the threat detection device, the airbag prevention device is configured to control an expansion of at least one of the prevention airbags in a direction corresponding to the first collision determination message through the airbag controller based on the direction corresponding to the first collision determination message;
   the threat detection device is further configured to detect a relative position and a relative distance between an obstacle around the vehicle and the vehicle through the sensor module after the vehicle has been impacted by the threat object, to assess a probability of collision between the obstacle and the vehicle through the collision assessment unit, and to establish a second collision determination message when a probability of collision between the obstacle and the vehicle is determined to be equal to or greater than a safety threshold; the airbag expansion controller is configured to control an expansion of at least one of the rear-side prevention airbag, the front-side prevention airbag, the left-side prevention airbag, or the right-side prevention airbag in an impact direction corresponding to the second collision determination message based on the second collision determination message, so as to reduce an impact force of the secondary collision between the vehicle and the obstacle.

2. The vehicle prevention airbag system according to claim 1, wherein the threat detection device further includes a vehicle body posture detection unit, the vehicle body posture detection unit is configured to detect an acceleration and a tilt angle of the vehicle body; the threat detection device is configured to provide a secondary collision assessment mechanism, the secondary collision assessment mechanism is configured to calculate and obtain a secondary impact direction prediction message based on a displacement or an acceleration of the vehicle detected by the vehicle body posture detection unit after the vehicle has been impacted, and to control the sensor module to use the sensor units corresponding to the secondary impact direction prediction message to detect obstacles or threat objects in a direction corresponding to the secondary impact direction prediction message.

3. The vehicle prevention airbag system according to claim 2, wherein the threat detection device is configured to detect the acceleration and the tilt angle of the vehicle through the vehicle body posture detection unit and to determine whether the vehicle is rolling over through calculation; when the threat detection device detects that the vehicle body is rolling over, a rollover determination message is established; the airbag expansion controller is configured to control the expansion of at least one of the front-side prevention airbag, the rear-side prevention airbag, the left-side prevention airbag, or the right-side prevention airbag on the side of the vehicle corresponding to a rollover direction based on the rollover determination message.

4. The vehicle prevention airbag system according to claim 1, wherein a forward sensor unit, a rearward sensor unit, leftward sensor unit, and a rightward sensor unit of the threat detection device each comprise at least one sensor, and the at least one sensor is one or a combination of an ultrasonic sensor, a millimeter-wave radar, a camera, a laser rangefinder, a depth camera, and a LiDAR.

5. The vehicle prevention airbag system according to claim 1, wherein the threat detection device is configured to be coupled to a vehicle control device of the vehicle, and the threat detection device is configured to control the vehicle to perform one or more of acceleration, deceleration, displacement, or steering actions through the vehicle control device when a probability of collision between any direction of the vehicle and a threat object is determined to be equal to or greater than a safety threshold.

6. The vehicle prevention airbag system according to claim 1, wherein the airbag prevention device further includes at least one upper prevention airbag disposed above the vehicle and capable of covering a roof of the vehicle, the threat detection device is configured to detect a threat object falling from above the vehicle and to establish a falling object threat message when a probability of collision between the threat object from above the vehicle and the vehicle is determined to be equal to or greater than a safety threshold; the airbag expansion controller is configured to control expansion of the at least one upper prevention airbag above the vehicle based on the falling object threat message.

* * * * *